US011198979B2

(12) United States Patent
Hutter et al.

(10) Patent No.: US 11,198,979 B2
(45) Date of Patent: Dec. 14, 2021

(54) LINE MARKING DEVICE AND METHOD FOR MARKING A LINE

(71) Applicant: SWOZI AG, Diepoldsau (CH)

(72) Inventors: Mario Hutter, Berneck (CH); Peter James Roberts, Wynnum (AU); Aleksander Valdis Velde, Taringa (AU); Mathias Wäckerlin, Altstätten (CH); Patrick Specker, Altstätten (CH)

(73) Assignee: SWOZI AG, Diepoldsau (CH)

( * ) Notice: Subject to any disclaimer, the term of this patent is extended or adjusted under 35 U.S.C. 154(b) by 0 days.

(21) Appl. No.: 16/632,944

(22) PCT Filed: Jul. 26, 2018

(86) PCT No.: PCT/EP2018/070277
§ 371 (c)(1),
(2) Date: Jan. 22, 2020

(87) PCT Pub. No.: WO2019/020739
PCT Pub. Date: Jan. 31, 2019

(65) Prior Publication Data
US 2020/0157751 A1  May 21, 2020

(30) Foreign Application Priority Data

Jul. 27, 2017  (EP) ..................... 17183518

(51) Int. Cl.
E01C 23/22 (2006.01)
E01F 9/518 (2016.01)
A63C 19/06 (2006.01)
B62D 5/04 (2006.01)
B62D 6/00 (2006.01)
B62D 7/22 (2006.01)
E01C 23/16 (2006.01)
(Continued)

(52) U.S. Cl.
CPC ............ E01C 23/22 (2013.01); A63C 19/065 (2013.01); B62D 5/04 (2013.01); B62D 5/0433 (2013.01);
(Continued)

(58) Field of Classification Search
CPC ........ E01C 23/22; E01C 23/163; E01F 9/518; A63C 19/065; B62D 5/04; B62D 5/0433;
(Continued)

(56) References Cited

U.S. PATENT DOCUMENTS 6,074,693 A     6/2000 Manning
2004/0057795 A1 3/2004 Mayfield et al.
(Continued)

FOREIGN PATENT DOCUMENTS

DE         40 13 950 A1   11/1991
DE    10 2014 112 587 A1   3/2015
(Continued)

OTHER PUBLICATIONS

International Search Report Corresponding to PCT/EP2018/070277 dated Jan. 17, 2019.
(Continued)

Primary Examiner — Michael D Lang
(74) Attorney, Agent, or Firm — Finch & Maloney, PLLC; Michael J. Bujold; Jay S. Franklin

(57) ABSTRACT

A line marking device (1) comprising a cart (2) with at least one steerable wheel (3) and at least two moving elements (4, 5). The steerable wheel (3) is rotatable around its axle (13) and pivotable such that the cart (2) is steered in a desired direction. The line marking device (1) comprises a GNSS receiver (7) or a robotic total station mounted on the cart (2). The line marking device (1) also comprises at least one spray nozzle (8), for marking a line, which is mounted on the cart and directed towards the ground below the line marking
(Continued)

Figure 1:
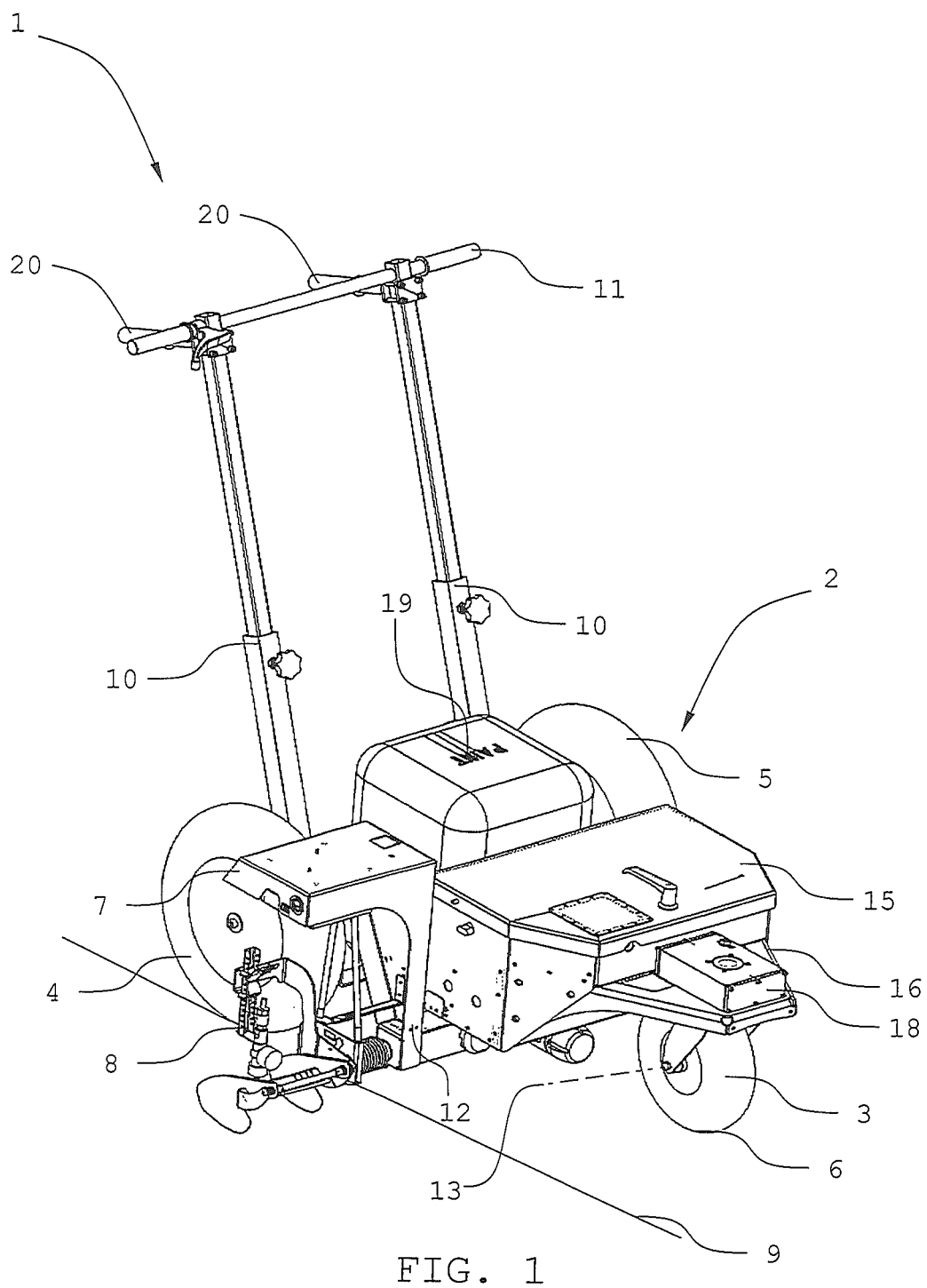

device (1). The device (1) comprises an interface mounted on the cart for a comparator to compare a detected location by the GNSS receiver (7) to a predetermined pattern. The cart (2) may comprise a motor (14) which is adapted to pivot the steerable wheel (3) towards an intended movement.

15 Claims, 4 Drawing Sheets

(51) Int. Cl.
*G05D 1/00* (2006.01)
*G05D 1/02* (2020.01)

(52) U.S. Cl.
CPC ............... *B62D 6/00* (2013.01); *B62D 7/22* (2013.01); *E01C 23/163* (2013.01); *E01F 9/518* (2016.02); *G05D 1/0088* (2013.01); *G05D 1/0278* (2013.01); *A63C 2019/067* (2013.01)

(58) Field of Classification Search
CPC .......... B62D 6/00; B62D 7/22; G05D 1/0088; G05D 1/0278
See application file for complete search history.

(56) References Cited

U.S. PATENT DOCUMENTS

| | | |
|---|---|---|
| 2007/0198159 A1 | 8/2007 | Durkos et al. |
| 2009/0114738 A1 | 5/2009 | Annese et al. |
| 2011/0039021 A1* | 2/2011 | Persson ................ A63C 19/065 427/137 |
| 2013/0184938 A1 | 7/2013 | Dolinar et al. |
| 2015/0136020 A1 | 5/2015 | Lins et al. |

FOREIGN PATENT DOCUMENTS

| | | | |
|---|---|---|---|
| JP | 06059723 A | * | 3/1994 |
| JP | H06-59723 A | | 3/1994 |
| WO | 2017/063652 A1 | | 4/2017 |
| WO | 2017/118501 A1 | | 7/2017 |

OTHER PUBLICATIONS

Written Opinion Corresponding to PCT/EP2018/070277 dated Jan. 17, 2019.

* cited by examiner

LINE MARKING DEVICE AND METHOD FOR MARKING A LINE

The present invention relates to a line marking device and a method for marking a line according to the preamble of the independent claims.

A variety of arrangements for marking a ground, such as a playing field, are known in the prior art. The simplest line marking method involves the tensioning of a chord along a boundary of a playing field. A user pushes a line marking device along the chord to mark playing field boundaries. Commercially available line marking machines are used in this line marking. Some machines include a line of sight guide to aid the operator in producing a straight line between two reference points.

Applications, in which line marking devices may be used, are reproducing information like logos or advertisement on a ground, road markings, or a pattern of a playing field, e.g. a golf course or a football field.

US 2009/0114738 A1 discloses a self-moved device suitable for spraying a fluid substance on a surface. The device comprises a management and control system for managing and controlling a moving system and a spraying system. The management and control system is suitable for guiding the motion of the self-moved device on a surface. However, since the device is fully automatized, it requires a complex control system and long set-up times.

Another device is disclosed in US 2004/0057795 A1. This document discloses an automatic ground marking apparatus including a carriage which is responsive to carriage control signals. The device comprises a position determining system. The determining system employs a laser beam and a reflecting tracking prism.

WO 2017/063652 A1 discloses a self-propelled robot unit including a navigation system and moving items. The device includes an impacting unit for marking a line. The document is also directed to a method for the creation of a plan for the robot unit's movements and placement of markings for a ball game field.

Fully automated devices are disadvantageous for surveying a field. A user would need a second surveying device for collecting GNSS data of existing items such as corner posts or goals. Further, automatic devices require a setup and programming effort and are thus more costly to produce. Further, obstacles, such as ditches or holes are only considered when they are manually inserted.

On the other hand, line marking devices, which are manually pushed and steered, need guides, such as a laser beam or a chord. Setting up the laser beam or the chord also requires a time-consuming set-up.

The object of the invention is to facilitate handling of a line marking device and marking straight lines according to predetermined pattern, while at the same time providing a low-cost line marking device, which is easy to handle. The object is in particular to provide a line marking device, which can also be used for surveying.

According to the invention, it is suggested to provide a line marking device. The line marking device comprises a cart with at least one steerable wheel and at least two moving elements. The steerable wheel is rotatable around its axle such that the cart is rollable over a surface. The steerable wheel is further pivotable such that the cart is steered in a direction. The line marking devices comprises further a GNSS (global navigation satellite system) receiver or a reflector for a robotic total station mounted on the cart. The reflector is preferably a prism. The line marking device also comprises at least one marking unit, preferably a spray nozzle, for depositing a material to mark a line. The marking unit is mounted on the cart. The nozzle is directed or directable towards a ground below the line marking device. The device comprises an interface mounted on the cart for a comparator to compare a detected location by the GNSS receiver to a predetermined pattern. The device comprises a steering unit for autonomously pivoting the at least one steerable wheel.

Thereby, the steerable wheel is pushed towards a desired direction independent of a user. Thus, the cart may be pushed along a straight line or along a circle without deviations.

The steering unit may be adapted to pivot the steerable wheel to at least one predetermined position. In one embodiment the predetermined position may be adjustable. The position may be adjustable manually or automatically with a motor. The steering unit may be positioned above the steerable wheel during intended use. The axle is preferably horizontal during intended use.

The cart may comprise a motor which is adapted to pivot the steerable wheel such as to provide an intended direction of movement. The motor is preferably an electric motor. Preferably the device comprises one motor.

Thereby, a line marking device can be guided along a straight line or any other desired path. The path is determined by the steerable wheel. A user only needs to push the cart forwards. At the same time, the cart is also suited for surveying a field and thus long surveying times for fully automated devices are avoided.

The interface may comprise a wireless receiver. Thereby, the electrical components may be stored in a box and may be protected from outside influences, like water or paint. Alternatively, the device may comprise a socket for the mobile computing device. The wireless receiver may be a Bluetooth or a wireless LAN receiver.

In one embodiment, the line marking device additionally includes a second GNSS receiver. The second GNSS receiver is preferably in a fixed spatial relationship to the first GNSS receiver. The second GNSS receiver allows a determination of an orientation of the line marking device. Thereby, a direction, in which the line marking device is headed, may be determined.

In a one embodiment, the steering unit comprises a clutch. The clutch forms a separable operative connection between the motor and the steerable wheel. Thereby, the motor may be separated from the steerable wheel allowing the steerable wheel to pivot freely.

In a preferred embodiment, the clutch is an overload clutch. Thereby, the line motor is released from the steerable wheel, if the forces or moments of forces become too high, for example due to a stone or blow to the steerable wheel. Thus, the motor is guarded against an overload.

It is further suggested to provide a set of a mobile computing device and a line marking device. It is also suggested to provide a set of a line marking device and a drive unit. The drive unit may be a motorized vehicle, a lawn mower or a golf cart.

In a preferred embodiment, the line marking device comprises a handle for manually pushing the line marking device. Thereby, a simple, low-cost device may be provided. The handle may comprise a grip. The grip is preferably connected to the clutch and adapted to release the clutch. Thereby, the clutch may be conveniently released.

Alternatively, the cart may comprise a coupler for coupling further vehicles. Thereby, the device may be driven by a motorized drive unit like a ride-on lawnmower. The coupler may allow a releasable connection to the motorized drive unit. The handle may include two couplers. The coupler may be shaped as tow bar. The coupler allows a releasable connection to the further vehicle.

In a variation, a leaf catcher may be coupled with the coupler to the line marking device. In a further variation, a grass roller or a leaf catcher or a fertilizing unit may be coupled via the coupler to the line marking device.

In a preferred embodiment, a spray nozzle is mounted on an arm. The arm extends from the cart, preferably in a transversal direction to the intended direction of movement. The arm comprises a hinge for folding the arm to the cart. Thereby, the arm may be folded away. Thus, space may be saved, while the line marking device is stored. Further, this may help with cleaning the line marking device, in particular with cleaning the spray nozzle and the arm, which are particularly exposed to the paint. The GNSS sensor may be attached to the arm. The GNSS sensor may be in fixed spatial relationship to the spray nozzle.

In one embodiment, the nozzle may be movable relatively to the device. In a first position, the nozzle may be adapted to mark a point. In a second, different position the nozzle may be adapted to paint a line.

In one embodiment, the device comprises a sensor to detect a predetermined location, such as a post or a goal. In one embodiment the sensor may be a proximity sensor or a distance sensor. Thereby, the device may paint lines up to the predetermined locations and then navigate around them.

In one embodiment, the device may comprise an optical sensor, such as a camera. The optical sensor allows a vision based detection of existing lines. In a further preferred embodiment, the device may comprise a controller configured to detect the line and to align the nozzle over the detected line. In a particularly preferred embodiment, the controller may detect a start or an end of a line. As a result existing lines can be accurately redrawn.

In a preferred embodiment, the device comprises a paint tank. The paint tank is arranged at least partially below an axle of the steerable wheel. Thereby, a center of gravity of the line marking device is low. As a result, the line marking device is stable and has a high resistance to falling over.

In a preferred embodiment, the device comprises only one steerable wheel. Thereby, a small turning radius of the line marking device is achieved.

In a preferred embodiment, the steerable wheel is in front of the at least two moving elements along an intended direction of movement. Thereby, holding and pushing the line marking manually or with a drive unit is facilitated and transverse forces along the intended direction of movement are reduced.

In a preferred embodiment, the steering unit comprises a centering device for biasing the steerable wheel towards a center position, in which the line marking device preferably moves in a straight line. Thereby, a user can push the cart along a straight line.

In a preferred embodiment, the centering device comprises a disc with at least one V- or U-shaped cut-out on its circumference. The centering device further comprises a preferably round steering rod. The disc is connected to the steerable wheel. A biasing element biases the steering rod towards a center position. The biasing element preferably pushes the steering rod into the V- or U-shaped cut-out. The center position is preferably a position in which the steering rod is in the lowest point of the U- or V-shaped cut-out. In the center position the line marking device preferably moves along a straight line. Thereby, a centering device is provided. The disc with a V- or U-shaped cut-out may be circular.

The disc may be in a horizontal position. The rod may extend along vertical axis. The biasing element may be a spring.

Thereby, a user can draw rounded lines by applying a fixed force. A counter force provided by the biasing element allows an easier drawing of round features. Furthermore, when the rod is outside of the cut-out the steerable wheel may be rotated freely.

The disc preferably comprises one cut-out. The disc may comprise two or three or more cut-outs along the circumference. The second and/or third cut-out may define predetermined radiuses, for example the radius of a center circle of a football field.

In a preferred embodiment, the at least two moving elements are wheels or crawler or skis.

In a preferred embodiment, the device comprises a second and/or a third motor for the two moving elements. The second and/or third motor rotates the moving elements around their axles. In a preferred embodiment, each moving element comprises its own motor. In a preferred embodiment, the motors support a pushing force of a user. The second and/or a third motor may be an electrical motor.

In a preferred embodiment, the second and/or third motor is a hub-drive.

The hub-drive may be a differential motor, which is preferably adapted to drive the second and third appeal. The differential hub drive may be adapted to align the device to a line.

In a preferred embodiment, the device comprises exactly two moving elements.

In a preferred embodiment, the device comprises a comparator. The comparator may be mounted to the cart and connected to the interface. The connection may be wireless or wired. The interface is preferably an electronic interface. The comparator is adapted to compare a detected location by the GNSS receiver to a predetermined pattern. The comparator is preferably adapted to determine the direction of intended movement. The motor for the steerable wheel may be controlled by the comparator. The comparator may be mounted to the handle.

The line marking device may comprise a mobile computing device. The line marking device may comprise a controller for the motor The line marking device may comprise a colour sensor configured to detect a colour of the lawn. The detected colour may indicate a condition (e.g. dry) of the lawn.

The line marking device may comprise a sampling mechanism. The sampling mechanism may be adapted to obtain a turf sample. The sampling mechanism may be attached to the frame and may come Thereby, a turf sample may be obtained as part of a survey or line marking or similar operation. The sampling mechanism may comprise a storage unit for obtained turf samples. The sampling mechanism may be adapted to obtain a second and/or third and/or further sample.

It is further suggested to provide a method for marking a line with the line marking device. The line marking device includes a cart. The method comprises the steps of:

Selecting a predetermined pattern, preferably with a mobile computing device;

Determining current position with a GNSS receiver or a prism for a robotic total station mounted on the cart;

Receiving an intended direction via the electronic interface;

Pivoting at least one, preferably one, steerable wheel towards an intended direction of movement with a motor, preferably an electric motor, wherein the steerable wheel is rotatable around an axle such that the cart is rollable over a surface.

In a preferred embodiment, the method comprises the step of a comparing the current position to the predetermined pattern. Particularly preferred the position is compared with a computing unit, i.e. the mobile computing device. Further, the method includes a step of determining an intended direction of movement from the current position and a predetermined pattern.

The line marking device may be used for sweeping a field, for mowing the lawn, for marking a second line with a second arm, and/or for orienting the grass. The orientation of the grass is particularly preferred made with a roll cylinder. The line marking device may include the roll cylinder. A further aspect of the invention is a use of the device for surveying a field.

Figure 2:
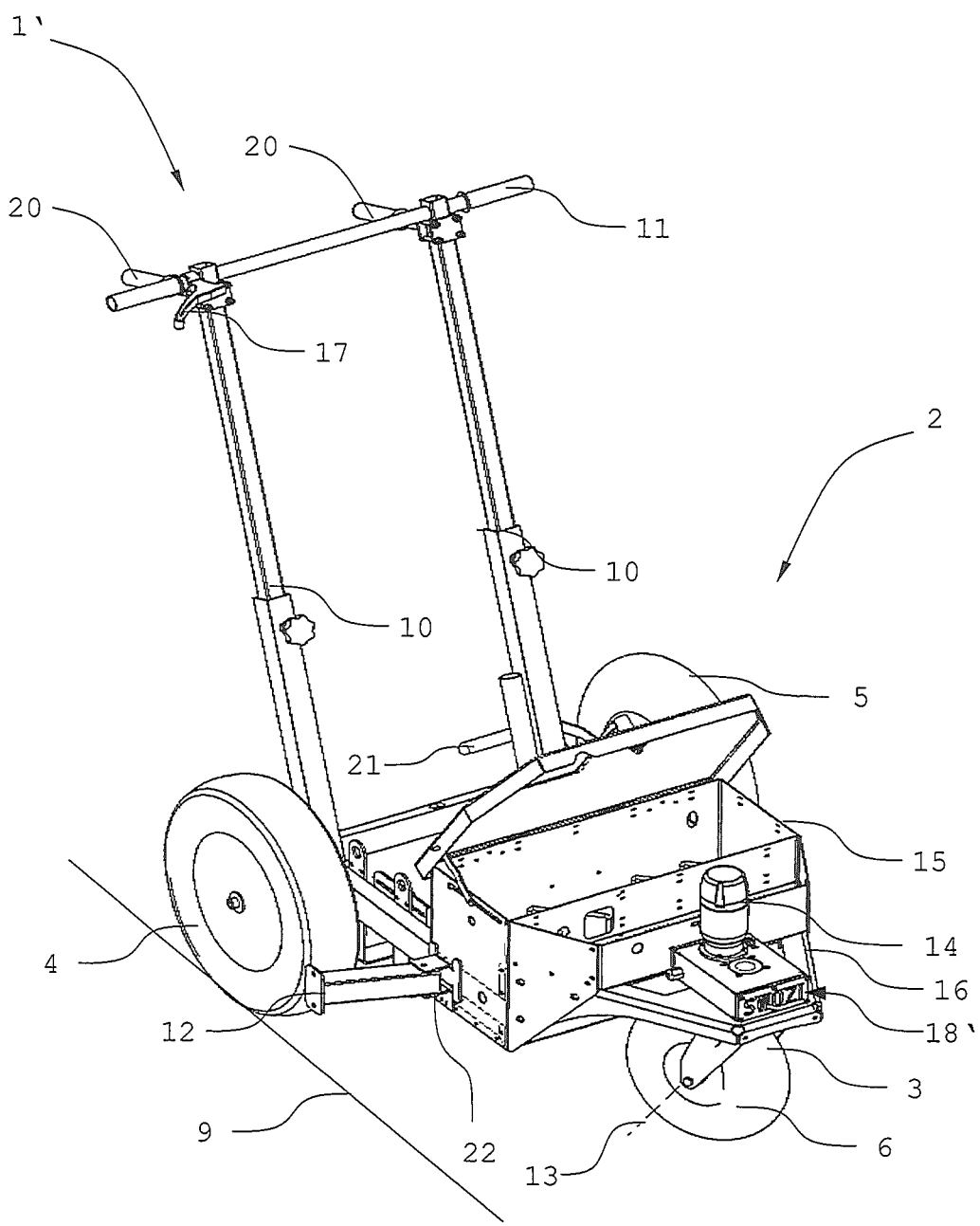
Figure 3:
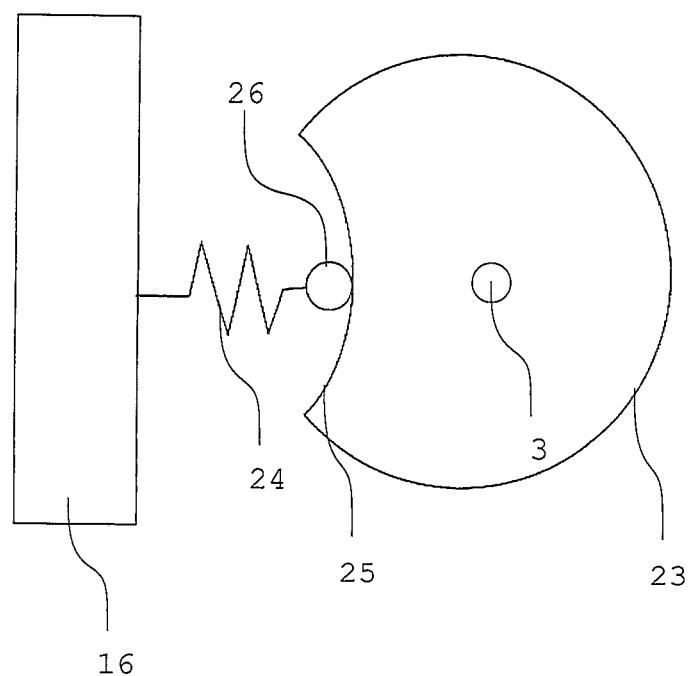
Figure 4:
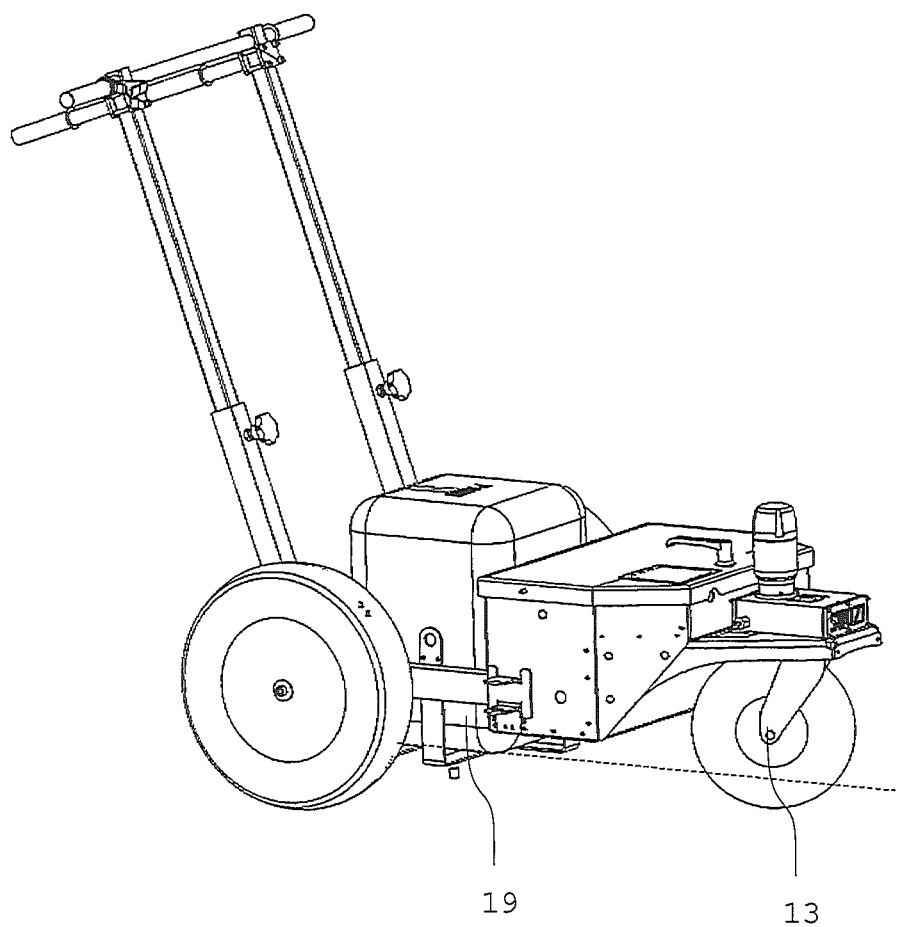

Non-limiting embodiments of the invention are described, by way of example only, with respect to the accompanying drawings, in which:

FIG. 1: is a perspective view of a first embodiment of a line marking device;

FIG. 2: is a perspective view of a second embodiment of the line marking device;

FIG. 3: is a schematic drawing of the functional principle of a steering unit; and FIG. 4: is another perspective view of a line marking device.

FIG. 1 shows a perspective view of a first embodiment of a line marking device 1. The line marking device 1 includes a cart 2 with a frame 16. Three wheels 3, 4, 5 are attached to the frame 16. A steerable wheel 3 is attached to the front of the cart 2. The steerable wheel 3 has a circular contour 6.

When the cart 2 is pushed forward, the steerable wheel rotates around its axle 13. Additionally, the steerable wheel 3 is pivotably mounted to the frame 16. This pivotable attachment allows a steering of the device 1. A steering unit 18 helps a user with steering the cart 2. The steering unit 18 is mounted above the steerable wheel 3.

The steerable unit 3 biases the steering wheel towards a center position, in which the cart 2 is moved along a straight line when it is pushed. Thereby, straight lines may be drawn. The cart 2 can also be pushed along curves, however the steering unit 18 forces the steering wheel 3 towards the center position. Thus, a higher force is necessary for pushing the cart along a curve. However, since the steering unit 18 provides a resistance, curves are also drawn more precisely. If the steerable wheel 3 is pivoted further, the wheel 3 becomes freely rotatable, such that tight turns are possible.

The steering unit 18 is described with reference to FIG. 3. FIG. 3 shows a schematic drawing of the functional principle of the steering unit 18 in a top view.

The steerable wheel 3 includes a circular disk 23 within the steering unit 18. The disk 23 extends horizontally, is attached to the steerable wheel 3 and is pivoted when the steerable wheel 3 is pivoted. The disk further includes a U-shaped cut-out. The steering unit 18 also comprises a steering rod 26. The steering rod 26 is pushed by a spring 24 into the U-shaped cut-out 25. The spring is fixedly connected to the frame 16 of the cart 2. Thereby, the steerable wheel 3 is biased towards the center position. In the center position the cart is pushed along a straight line. If the user makes a sharp turn, the wheel becomes freely rotatable, when the steering rod 26 leaves the U-shaped cut-out.

Referring to FIG. 1, a box 15 is mounted on the frame 16 and includes a wireless interface for wirelessly connecting the electronic box to a mobile computing unit (not shown), e.g. a smartphone or a tablet. The interface is a wireless receiver and the connection to the mobile computing device is established with Bluetooth.

The box 15 also comprises a pump. The pump conveys paint from a paint tank 19 to a spray nozzle 8. The paint tank is mounted behind the box 15. Further the paint tank 19 is partially mounted below an axle 13 of the steerable wheel 3 and axles of wheels 4, 5 (see FIG. 4). The box 15 additionally comprises batteries. The batteries supply energy for the interface, the motor and the pump.

An arm 12 extends transversally out from the box 15. At the end of the arm, the spray nozzle 8 is attached. The spray nozzle 8 deposits the paint stored in the paint tank 19 onto a ground 9.

A user selects a desired pattern to be drawn. The pattern may be selected from templates, such as a football field or baseball field, or it may be drawn in advance, such as a parking lot, markings for a construction site or road markings.

The direction of intended movement is calculated by the mobile computing device. The device 1 comprises a GNSS sensor 7, which is attached to the arm 12. The GNSS sensor determines a current position of the cart. Then, the position is transmitted via the electronic interface to the mobile computing device.

The mobile computing device compares the current position to the pattern and calculates a path along which the cart should be guided. While a user pushes the cart 2 at a handle 11, the mobile computing device guides the user along the calculated path. Due to the steering unit the cart is guided along straight lines.

The handle 11 is connected to the cart with two fasteners 10. Optionally, instead of manually pushing, the cart may be driven by a motorized drive unit like a ride-on lawnmower. The handle 11 includes two couplers 20. The couplers 20 allow a releasable connection to the motorized drive unit.

FIG. 2 shows a second embodiment the line marking device 1'. The second embodiment is similar to first embodiment shown in FIG. 1.

In contrast to the first embodiment, the steerable wheel 3 is pivoted by a steering unit 18' with a motor 14. The motor 14 is electric and mounted above the steerable wheel 3. A steering rod of the steerable wheel 3 and the motor 14 both comprise a gear-wheel. The gear-wheels are engaged and thereby the motor pivots the steerable wheel 3. Behind the motor 14, the box 15 is located. The box 15 comprises a controller for the motor 14.

The mobile computing device (not shown) controls the motor 14 via the wireless interface and the controller. The mobile computing device provides instructions according to which the steerable wheel 3 is pivoted.

The steerable wheel 3 is pivoted according to the calculated path. The user may be warned with the mobile computing device before turns, in particular before sharp turns.

For example, the pitch circle of a football field is round. When the circle is drawn the mobile computing device pivots the steerable wheel 3 to an angled position and the device can be pushed along a circle.

Furthermore, the steering unit 18' comprises a gearing mechanism with a clutch. The pushing handle comprises a grip 17. When the user pulls the grip 17, the clutch decouples the motor 14 from the steerable wheel 3 by disengaging the gear-wheels. Then, the steerable wheel 3 can freely rotate without the motor.

The steering unit 18' additionally allows a decoupling of the motor 14 and the steerable wheel 3, if a force threshold is exceeded. The steerable wheel 3 is connected to the gear-wheel of the steering rod with a stick-slip friction grip. As long as the forces are below the threshold, the motor is directly coupled to the steerable wheel via a friction fit. Once forces or moments applied to the steerable wheel 3, for example by a curb, exceed the threshold the wheel rotates independent of the motor 14. This protects the motor 14 from hits onto the steerable wheel 3.

The motor 14 detects a slip and transmits the information to the mobile computing device. Thereby, the deviation in position is compensated.

The cart 2 includes a brake (not shown) with a brake pedal 21. The brake stops the wheel 5, when the pedal 21 is actuated. The arm 12 includes a hinge 22, which allows folding the arm away. In the folded away position the arm is aligned to the box. The nozzle 8 and the GNSS sensor 7 are attached to the foldable arm 12. The arm 12 and the brake may be used in both embodiments of the invention.

The mobile computing device comprises an electronic storage. In the storage predetermined patterns, e.g. a football field or a baseball field or a parking lot are stored. A user first surveys the field with the device and then selects the desired field to be marked. Then, the mobile device may display directions according to which the user can mark the field with a device 1 according to the first embodiment of the invention. Or, alternatively, the user may simply push a device 1' according to the second embodiment of the invention and the steerable wheel determines the direction of movement according the calculated path.

The invention claimed is:

1. A line marking device comprising:
   a cart with at least one steerable wheel and at least two moving elements, wherein the steerable wheel is rotatable around its axle such that the cart is rollable over a surface and pivotable such that the cart is steered in a direction;
   a GNSS receiver or a reflector for a robotic total station mounted on the cart; and
   at least one marking unit for depositing a material to mark a line mounted on the cart,
   wherein a nozzle is directed towards a ground below the line marking device; and
   an interface mounted on the cart for a comparator adapted to compare a detected location by the GNSS receiver to a predetermined pattern; and
   the cart comprises a steering unit for autonomously pivoting the at least one steerable wheel, wherein the device comprises only one steerable wheel.

2. The line marking device according to claim 1, wherein the steering unit comprises a motor (14), preferably an electric motor, adapted to pivot the steerable wheel towards an intended direction of movement.

3. The line marking device according to claim 2, wherein the steering unit comprises a clutch, and the clutch forms a separable operative connection between the motor and the steerable wheel.

4. The line marking device according to claim 3, wherein the clutch is an overload clutch.

5. The line marking device according to claim 1, wherein the device comprises a handle for manually pushing the line marking device.

6. The line marking device according to claim 1, wherein the spray nozzle is mounted on an arm, the arm extends from the cart and the arm comprises a hinge for folding the arm to the cart.

7. The line marking device according to claim 1, wherein the device comprises a paint tank, and the paint tank is arranged at least partially below the axle of the steerable wheel.

8. The line marking device according to claim 1, wherein the steerable wheel in front of the at least two moving elements along an intended direction of movement.

9. The line marking device according to claim 1, wherein the steering unit comprises a centering device for biasing the steerable wheel towards a center position.

10. The line marking device according to claim 9, wherein the centering device comprises a disk with a V or U-shaped cut-out on a circumference, and a steering rod, and a biasing element biases the steering rod towards the center position.

11. The line marking device according to claim 10, wherein the steering rod is connected to the frame.

12. The line marking device according to claim 1, wherein the device comprises exactly two moving elements.

13. The line marking device according to claim 1, wherein the device comprises a comparator, which is mounted to the cart and connected to the interface, the comparator is adapted to compare a detected location by the GNSS receiver to a predetermined pattern and the motor is controlled by the comparator.

14. The line marking device according to claim 13, wherein the comparator is adapted to determine the direction of intended movement.

15. The line marking device according to claim 1, wherein the marking unit is a spray nozzle.

* * * * *